Feb. 20, 1940.  C. S. HAZARD  2,191,154
SAFETY DEVICE FOR DISPENSING PUMPS
Filed Sept. 9, 1937  2 Sheets-Sheet 1
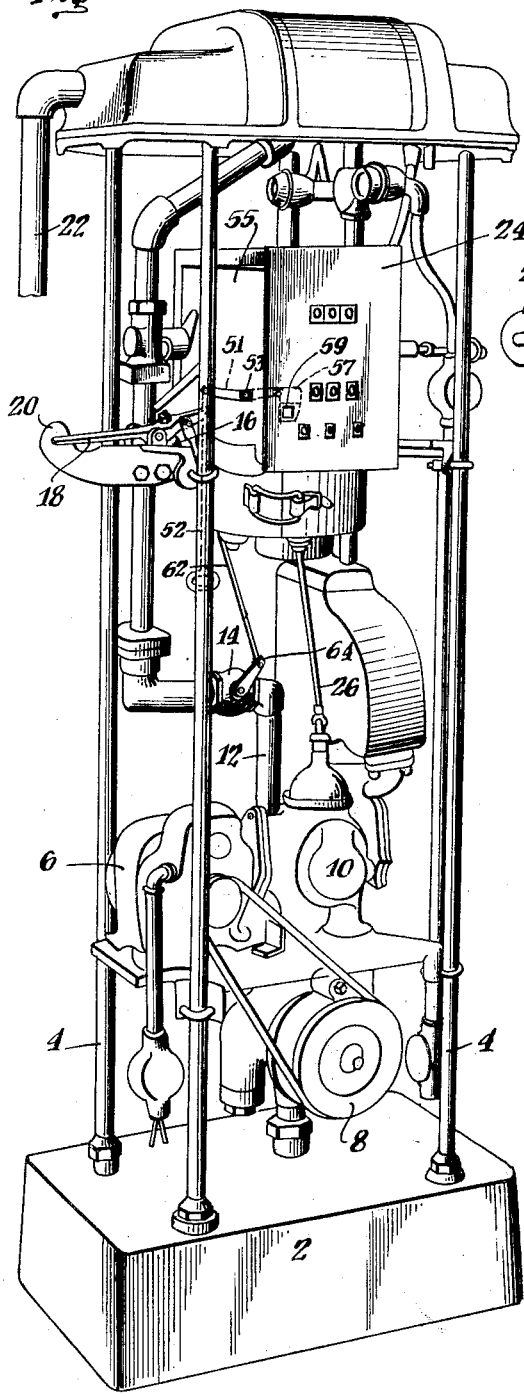
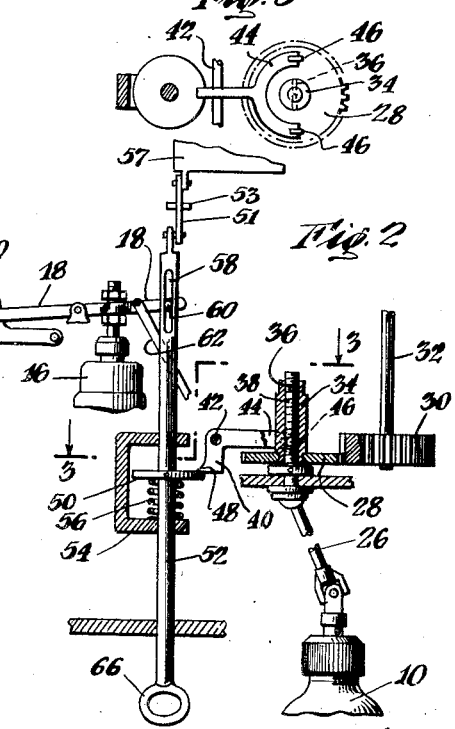
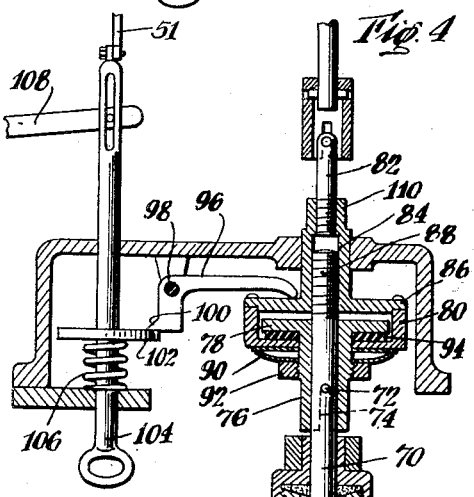
INVENTOR
Charles S. Hazard
BY
ATTORNEYS Feb. 20, 1940.          C. S. HAZARD                2,191,154
              SAFETY DEVICE FOR DISPENSING PUMPS
                  Filed Sept. 9, 1937          2 Sheets-Sheet 2

Fig. 5

INVENTOR
Charles S. Hazard
BY
Hoguet, Neary & Campbell
ATTORNEYS

Patented Feb. 20, 1940

2,191,154

UNITED STATES PATENT OFFICE 2,191,154

SAFETY DEVICE FOR DISPENSING PUMPS

Charles S. Hazard, New York, N. Y., assignor to Neptune Meter Company, a corporation of New Jersey Application September 9, 1937, Serial No. 163,025

20 Claims. (Cl. 221—95)

This invention relates to liquid dispensing devices, such as those used in dispensing gasolene and the like, and particularly to control mechanism for such devices responsive to abnormal resistance to operation of a registering element to prevent the delivery of liquid from the device and to avoid injury to the register or to other elements of the mechanism.

Liquid dispensing devices having registers for indicating the volume or the cost of the liquid dispensed are liable to become bound up or jammed from time to time. This danger is greater when using registers of the computing type which indicate both the volume and the cost of the liquid dispensed. In some instances also the meter may rotate backward, tending to rotate the register backward. In either of these cases and under certain other conditions the resistance to rotation of the register is abnormally increased or it becomes impossible for the meter to drive the register. However, the meter tends to operate as long as liquid is supplied thereto and therefore some element of the construction must give way. As a result the meter or the register or both may be injured or broken before the condition can be corrected.

It is usual to provide a shear pin in the connection between the register and meter to prevent injury thereto or to other elements of the construction when the resistance to operation of the register is abnormally increased. However, the shear pin may break without the knowledge of the attendant, in which case gasolene or other liquid may be dispensed without causing the register to be operated and before the attendant notices that the register is not operating. It is impossible then for the attendant to determine the amount of liquid delivered, or the cost thereof so that losses result or discussion occurs which is injurious to patronage.

In order to overcome these objections to constructions of the prior art, the present invention provides means responsive to abnormal resistance to operation of the register to terminate flow of liquid through the meter and to actuate a signal to indicate that the register is out of order. The control means may serve to actuate any selected flow establishing means or any number of selected flow establishing means such as the usual pump motor and/or a flow control valve to prevent the flow of liquid through the meter, or it may operate in any other suitable way to control the supply of liquid and prevent the dispensing thereof and the operation of the meter without a corresponding operation of the register. Similarly the signal may be of any suitable type and may be operated by any suitable means in response to improper operation of the device and either the signal or the control means may be used independently.

One of the objects of the invention is to provide novel means controlling the operation of the dispensing device to prevent operation of the meter independently of the register.

Another object of the invention is to provide means responsive to abnormal resistance to operation of the register for preventing the flow of liquid through the meter.

A further object of the invention is to provide control mechanism for a liquid dispensing device operable automatically to terminate the delivery of liquid upon improper operation of the mechanism or the occurrence of conditions which might injure or destroy an element thereof.

Another object of the invention is to provide a signal operable to warn the customer or attendant in the event an element of the device fails to operate or functions improperly.

These and other objects and features of the invention will appear in the following description thereof, in which reference is made to the accompanying figures of the drawings, in which:

Fig. 1 is a view in elevation of a typical dispensing device embodying the present invention with the housing for the device removed and certain parts thereof broken away;

Fig. 2 is an enlarged view, partly in section and partly in elevation, of the control means embodied in the dispensing device illustrated in Fig. 1;

Fig. 3 is a horizontal sectional view of a portion of the construction illustrated in Fig. 2, taken on the line 3—3 of Fig. 2;

Fig. 4 is a vertical sectional view of an alternative form of control means embodying the present invention and adapted for use in a dispensing device such as that illustrated in Fig. 1, and Fig. 5 is a view, partly in section and partly in elevation of a further alternative form of control means embodying the present invention and adapted for use in the dispensing device illustrated in Fig. 1.

In that form of the invention illustrated in Figs. 1, 2, and 3 of the drawings a dispensing pump of a conventional type is shown having a base 2 and standards 4 for supporting a motor 6, a pump 8 and a meter 10 by which the liquid dispensed is measured. Liquid passed from the meter 10 flows through a conduit 12 having a valve 14 therein. A switch 16 for controlling the operation of the motor 6 and pump 8 is provided with an operating member 18 located adjacent the usual support 20 for a nozzle connected to the dispensing hose 22.

The form and location of the switch 16 and the operating means therefor, as well as the construction and location of the valve 14 between the meter and dispensing hose may be varied as desired for controlling the operation of the means employed for supplying liquid to the dispensing hose. For example, instead of placing the valve 14 in the conduit between the meter and dispensing hose it may be placed with equal effect between the pump and meter.

The meter 10, when operated, serves to drive a register 24, which may be of any suitable type and may be a computing register for indicating both the volume and the cost of the liquid dispensed. A shaft 26, driven by the meter, is connected to the register by suitable means, such as that illustrated in Figs. 2 and 3, wherein the meter shaft 26 is provided with a gear 28 meshing with a gear 30 secured to a register shaft 32. The gear 28 is carried by a sleeve 34, which is secured to the shaft 26 by means of a shear pin 36. The sleeve 34 and the upper end of the meter shaft 26 are provided with complementary threads 38 so that upon relative rotation of the sleeve 34 and meter shaft 26 the sleeve 34 will be moved axially relative to the shaft 26 by the threads. Thus, in the event the register should become bound so that gears 30 and 28 are held against rotation and the resistance to rotation thereof is abnormally increased, the meter shaft, which still tends to rotate, will serve to shear the pin 36 and cause the sleeve 34 and the gear 28 to be raised by continued rotation of the meter shaft.

Such independent movement of the meter shaft and the register shaft responsive to abnormal resistance to operation of the register is utilized to terminate operation of the dispensing mechanism and prevent further delivery of liquid through the meter and to actuate a warning signal. For this purpose a latch 40, pivotally mounted at 42, is provided on a yoke 44 having rollers 46 carried thereby and engaging the upper surface of the gear 28. The opposite end of the latch is provided with a holding portion 48 engaging a collar 50 carried by a movable rod 52 slidably mounted in a frame member 54 secured to the standards 4. A power storage means such as spring 56 serves to actuate the rod 52. The spring bears against the frame 54 and the collar 50 and urges the rod 52 upward, forcing the collar 50 against the holding portion 48 of the latch. The rollers 46, carried by the yoke on the opposite side of the pivot for the latch thus are held in engagement with the upper surface of the gear 28 limiting clockwise rotation of the latch as seen in Fig. 2 under the action of the spring 56. In this way the rod 52 normally is held against upward movement. However upon the occurrence of abnormal resistance to operation of the register whereby independent rotation of the meter and register shafts takes place and sleeve 34 and gear 28 are raised, the latch 40 is rotated about its pivot retracting the holding portion of the latch from the collar 50, and the rod 52 is released for upward movement under the action of spring 56.

The upper end of the rod 52 is provided with a slot 58 for receiving a pin 60 on the operating member 18. The slot 58 is of sufficient length to permit movement of the operating member 18 to actuate the switch 16 in the normal operation of the dispensing device. However, on release of the rod 52, by operation of the latch 40, and on raising of the rod 52 by the spring 56, the lower end of the slot 58 is moved into engagement with the pin 60 to raise the inner end of the operating member 18 to actuate the switch 16 and stop the pump motor.

The operating member is also provided with a link 62 pivotally connected thereto and connected to an operating arm 64 of the valve 14. On normal operation of the member 18 to actuate the switch 16 and initiate a dispensing operation by raising the free end of the member and depressing the inner end thereof, the valve 14 is opened to permit liquid to flow from the pump through the meter 10 and to the dispensing hose 22. On upward movement of the inner end of the operating member 18 either on manual operation thereof at the termination of a dispensing operation or on automatic operation of the operating member by the rod 52 the valve 14 is closed so that the delivery of liquid through the meter is prevented.

If desired, the operating member 18 may be used to actuate only the switch or only the valve 14 but both the switch and the valve or any other movable element of the device may be actuated by the rod 52 to control the device. In this respect the rod 52 serves as a control member actuated in response to abnormal resistance to operation of the register and controlled by an element of the releasable connection between the meter and register on release thereof.

The control member is also employed for operating a warning signal to notify the customer or attendant on improper operation of the mechanism. For this purpose a signal actuating lever 51 is connected to the upper end of rod 52 and is pivotally movable about a support 53 on the register housing 55. The opposite end of the lever is connected to a signal device shown as a visible signal in the form of a plate 57, which may carry the legend "Register out of order" on its face, to be observable through an opening 59 in the face of the register when the signal is moved into a lowered warning position on upward movement of the rod 52.

The rod 52 is provided with a ring, or other means 66 on the free end thereof, by which it may be restored to its normal lowered position as seen in Fig. 2 when the sleeve 34 has been returned to its normal position. The upper end of the internally threaded sleeve 34 may be suitably formed to receive a wrench, or other means for turning the sleeve relative to the meter shaft 26 to restore the sleeve and gear 28 to their lowered positions, shown in Fig. 2, on release of the registering mechanism, so that it no longer is bound and does not present abnormal resistance to operation thereof. The shear pin 36 may then be renewed and the rod 52 pulled downward against the action of spring 56 until the holding portion 48 of the latch 40 and the collar 50 are restored to their holding positions. The mechanism is thus rendered operative again to drive the register from the meter.

In that form of the invention illustrated in Fig. 4, a meter-driven shaft 70 is provided with a pin 72 which extends into a slot 74 in a sleeve 76 of a friction member 78. A second friction member 80 is secured to the register shaft 82 by means of an internally threaded sleeve 84 having a collar 86 to which the friction element 80 is suitably secured. The upper end of the shaft 70 is threaded at 88 to receive the sleeve 84 carried by the register shaft so that on relative rotation of the meter shaft 70 and the register shaft 82 the sleeve 84 is moved upward, from the normal position shown in Fig. 4. The elements 78 and 80, secured to the meter shaft and the register shaft, respectively, are normally held against relative rotation by means of a spring member 90 bearing against a nut 92 on the sleeve 76 and bearing against the lower surface of the element 80. A friction ring 94, located between the lower face of the element 78 and the upper, inner face of the element 80 cooperates with the spring member 90 to resist relative rotation of the shafts 70 and 82 but to provide a slip connection between the meter shaft 70 and the register shaft 82 whereby said shafts are capable of relative rotation in the event the register should become bound or abnormal resistance to operation of the register should be presented.

Upon the occurrence of such relative movement of the elements 78 and 80 secured to the meter and register shafts, respectively, the thread 88 on the meter shaft cooperates with the internal thread on the sleeve 84 to raise the elements 78 and 80, whereby the latch 96 is rocked about its pivot 98 and the holding portion 100 of the latch is moved out of engagement with the collar 102, secured to the control member 104.

The operation of the latch 96, the collar 102 and the control member 104 are similar to those described above in connection with the construction illustrated in Fig. 2. A spring 106 urges the collar 102 and the control member 104 upward so that upon release thereof by the latch 96 the control member serves to actuate an operating member 108 connected to the switch 16, or the valve 14 or both or to any other suitable element of the device for the purpose of preventing the delivery of liquid from the pump through the meter.

In order to reset the elements to the position shown in Fig. 4 sleeve 84 is squared at 110 to receive a wrench so that the elements 78 and 80 may be moved downward by rotating the sleeve 84 relative to the meter shaft 70. The releasable connection between the shafts 70 and 82 thus is maintained at all times by the friction elements and does not require the renewing of any shear pin or other element of the construction to restore the device to an operative condition.

The construction illustrated in Fig. 5 of the drawings is somewhat similar to that shown in Fig. 4, but is operable to prevent the continued operation of the meter, either in the event the register becomes bound so that it cannot be rotated in the normal manner or in the event the meter is rotated backward and the register is held against free retrograde movement as is usually the case.

In the construction shown, the meter shaft 112 is threaded on its upper end at 114 and is provided with a member 116 the lower surface of which carries a friction ring 118. The register shaft 120 is connected to an internally threaded sleeve 122 by a pin 124 carried at the upper end of the sleeve and engageable in a slot 126 in the member 128 on the register shaft. The internal thread on sleeve 122 cooperates with the thread 114 on the meter shaft 112 so that on relative rotation of the sleeve and shaft 112 the sleeve is moved either up or down depending upon whether the meter shaft is rotated in one direction or the other. A collar 130 carried by the sleeve has downwardly extending pins 132 projecting through openings in a disc 134 located beneath the friction ring 118. The disc is urged against the friction ring by a spring member 136 bearing against a nut 138 threaded on the hub 140' of the member 116. A releasable driving connection is thus provided between the meter shaft and the register shaft whereby during normal operation these shafts are caused to rotate together but upon abnormal resistance to rotation of the register shaft the elements of the connection are capable of relative movement to cause the sleeve 122 to be raised or lowered by the cooperating threads on the sleeve and meter shaft.

The sleeve 122 is formed with annular flange 140 spaced from the upper surface of the collar 130 to receive the end 142 of a latch operating lever 144 pivotally mounted at 146. The free end of the latch operating lever is provided with a pin 148 engaging adjacent inclined srufaces 150 and 152 constituting the sides of a V-shaped recess in a latch member 154. The latch member is pivotally mounted at 156 and is urged against the pin 148 on the latch operating lever by means of a spring 158 but is movable to the right as seen in Fig. 5 against the action of the spring 158 by engagement of the pin 148 with one or the other of the inclined surfaces 150 and 152 on pivotal movement of the latch operating lever 144 by raising or lowering of the sleeve 122.

The latch member is provided with a holding portion 160 for engaging a collar 162 on the rod 164 to retain the rod in the lowered position shown against the action of spring 166. On movement of the latch member to the right in response to relative rotation of the meter and register shafts the rod 164 is released to move upward and actuate the switch 16 or other elements of the dispensing device controlled thereby. The device may be reset to the normal position illustrated by returning the sleeve 122 to the position shown after which the rod 164 which serves as a control member may be pulled downward by the handle 170 to restore the latch 154 and the control member to their holding positions.

In general the operation of each of the forms of the invention is the same. The means for establishing flow of liquid through the meter, whether it be the switch 16 for the pump motor or the valve 14 or any other element of the device, may be actuated by a manually movable operating member in the usual manner for normal operation in dispensing liquids. However in the event the register should become bound or the meter should be driven backward or abnormal resistance to operation of the register should be presented for any other reason, the threaded element associated with the meter will be caused to rotate while that associated with the register will be held against rotation causing one of the elements to be moved axially to displace the latch which normally holds the control member 52, 104 or 164 against movement.

On release of the control member the spring associated therewith moves the control member upward, as shown in the drawings, to actuate the operating member automatically to terminate the supply of liquid through the meter by throwing the switch 16 to its "off" position or closing valve 14 or by actuating both the switch and the valve or other control means for the dispensing device. At the same time the signal is actuated by moving the lever 51 about its pivot to bring the plate 57 into view through opening 59.

Thereafter, if an attempt is made to actuate the dispensing means by manual operation of the operating member before restoring the threaded elements and the control member to their normal positions, shown in the drawings, the control member will return the operating member to its raised position terminating operation of the device as soon as the operating member is released. However, after the releasable connecting means are restored to their normal operating positions the control member can be moved downward against the action of its spring to cause the latch and collar to assume their holding positions so that the dispensing device may be operated in the usual manner until the register again becomes bound or the control member is otherwise released.

The present invention thus prevents the delivery of liquid by the dispensing device without proper operation of the register and meter to indicate the amount or cost of the liquid dispensed. Furthermore the elements of the construction are safeguarded against injury by releasing the register when injury to the meter or register would occur on continued operation and a warning is given when the register or device is out of order or functions improperly.

The control member used in each of the forms of the invention illustrated may be altered to actuate any desired elements of the dispensing device and may be actuated by power storage means other than the spring shown. The releasable connection between the meter shaft and the register shaft also may be of any desired type or construction for actuating the control member on release thereof. It will also be apparent that any type of warning signal may be employed and that other changes in the construction, arrangement and application of the elements of the invention may be made without departing from the spirit of the invention. Therefore the forms of the invention herein shown and described should be understood as illustrative of the invention rather than as limiting the scope thereof.

I claim:

1. In combination with a liquid dispensing device having a meter, means for establishing flow of liquid through said meter and a register responsive to operation of said meter, means releasably connecting said meter and said register, and means responsive to a releasing movement of said connecting means caused by an abnormal resistance to operation of said register for controlling operation of said flow establishing means.

2. In combination with a liquid dispensing device having a meter, means for establishing flow of liquid through said meter and a register responsive to operation of said meter, shafts connected to said meter and register, and means responsive to independent movement of said shafts controlling operation of said flow establishing means.

3. In combination with a liquid dispensing device having a meter, means for establishing flow of liquid through said meter and a register responsive to operation of said meter, shafts connected to said meter and register, means releasably connecting said shafts movable relative thereof on release of said shafts, and means controlling operation of said flow establishing means actuated by said releasable connecting means on movement thereof relative to said shafts.

4. In combination with a liquid dispensing device having a meter, means for establishing flow of liquid through said meter and a register responsive to operation of said meter, shafts connected to said meter and register, a driving connection between said shafts responsive to abnormal resistance to rotation of said register shaft and operative to permit movement of said meter shaft independently of said register shaft, and means controlling operation of said flow establishing means actuated on movement of said meter shaft independently of said register shaft.

5. In combination with a liquid dispensing device having a meter, means for establishing flow of liquid through said meter and a register responsive to operation of said meter, relatively movable elements connected to said meter and register, means holding said elements in frictional engagement to maintain a driving connection therebetween during normal operation of the meter and register, but permitting relative movement of the elements on abnormal resistance to operation of said register, and means controlling operation of said flow establishing means actuated by one of said elements on relative movement of said elements.

6. In combination with a liquid dispensing device having a meter, means for establishing flow of liquid through said meter and a register responsive to operation of said meter, relatively movable elements connected to said meter and register, a shearable member connecting said elements to maintain a driving connection therebetween during normal operation of the meter and register, but shearable to break said driving connection and permit relative movement of said elements on abnormal resistance to operation of the register, and means controlling said flow establishing means actuated by one of said elements on relative movement of said elements.

7. In combination with a liquid dispensing device having a meter, means for controlling flow of liquid through said meter and a register responsive to operation of said meter, shafts connected to said meter and register, a threaded member on one of said shafts, a complementary threaded member connected to the other of said shafts, means normally resisting relative rotation of said threaded members, but releasable on abnormal resistance to rotation of said register shaft, and means controlling operation of said flow controlling means actuated by one of said threaded members on relative movement thereof.

8. In combination with a liquid dispensing device having a pump, a motor for actuating the pump, a meter to which liquid is supplied by said pump and a register responsive to operation of said meter, means releasably connecting said meter and register, said connecting means being operable to release said register should the register present abnormal resistance to operation, and means controlling operation of said motor actuated by said releasable connecting means to stop said motor upon a releasing operation of said connecting means.

9. In combination with a liquid dispensing device having a pump, a meter to which liquid is supplied by said pump, and a register responsive to operation of said meter, means releasably connecting said meter and register, said connecting means being operable to release said register should the register present abnormal resistance to operation, and means controlling the flow of liquid from said pump through said meter actuated by said releasable connecting means to terminate the flow of liquid through said meter upon a releasing operation of said connecting means.

10. In combination with a liquid dispensing device having a meter, means for establishing flow of liquid through said meter and a register responsive to operation of said meter, an operating member controlling operation of said flow establishing means and a control member operatively connected to said meter and said register and responsive to abnormal resistance to operation of said register for actuating said operating member to stop flow of liquid through said meter.

11. In combination with a liquid dispensing device having a meter, a pump for supplying liquid to said meter, a motor for actuating said pump and a register responsive to operation of said meter, an operating member movable to start and stop said motor, and a control member operatively connected to said meter and said register and responsive to abnormal resistance to operation of said register movable to actuate said operating member to stop said motor.

12. In combination with a liquid dispensing device, a meter, a source of liquid supply, a dispensing hose, and a register responsive to operation of said meter, a valve interposed between said meter and said dispensing hose movable to terminate the delivery of liquid from said source through said meter, a signal, and means operatively connected to said meter and said register and responsive to abnormal resistance to operation of said register for actuating said valve to terminate the flow of liquid through said meter and actuate said signal to indicate disorder in said dispensing device.

13. In combination with a liquid dispensing device having a meter and a register responsive to operation of the meter, means releasably connecting said meter and register, said connecting means being operable to release said register should the register present abnormal resistance to operation, a signal and means for actuating said signal in response to a releasing movement of said releasable connecting means.

14. In combination with a liquid dispensing device having members normally movable in a predetermined relation during operation of the device and independently movable only on improper operation of an element of the device with which one of said members is associated, a signal and means actuated by one of said members on movement thereof independently of the other for actuating said signal.

15. In combination with a liquid dispensing device having a meter, means for establishing flow of liquid through said meter and a register responsive to operation of said meter, a control member movable to actuate said flow establishing means to stop liquid flow through said meter, a latch normally holding said control member against movement and means operatively connected to said latch and responsive to abnormal resistance to operation of said register to move said latch and release said control member for movement to stop flow of liquid through said meter.

16. In combination with a liquid dispensing device having a meter, means for establishing flow of liquid through the meter and a register responsive to operation of said meter, means releasably connecting said meter and register to drive the register, a control member movable to actuate said flow establishing means to stop liquid flow through said meter, a latch normally holding said control member against said actuating movement, and means actuated by said releasable connecting means on release thereof to move said latch and allow said control member to move and actuate said flow establishing means to stop flow of liquid through said meter.

17. In combination with a liquid dispensing device having a meter, means for establishing flow of liquid through said meter and a register responsive to operation of said meter, means releasably connecting said meter and register to drive the register, an operating member controlling actuation of said flow establishing means, a control member operable to actuate said operating member to stop flow of liquid through said meter, a latch normally holding said control member against movement, and means actuated by said releasable connecting means on release thereof to move said latch to allow said control member to move for actuating said operating member to stop flow of liquid through said meter.

18. In combination with a liquid dispensing device having a meter, means for establishing flow of liquid through the meter and a register responsive to operation of said meter, means releasably connecting said meter and register to drive the register, a control member movable to actuate said flow establishing means to stop liquid flow, a latch normally holding said control member against said actuating movement, means actuated by said releasable connecting means on release thereof to move said latch and allow said control member to move and actuate said flow establishing means to stop liquid flow, and means connected to said control member and movable to restore said member and latch to their normal holding relation.

19. In combination with a liquid dispensing device having a meter, means for controlling flow of liquid through said meter and a register responsive to operation of said meter, shafts driven by said meter and register, releasable connecting means for said shafts normally serving to drive said register from said meter but releasable in response to abnormal resistance to operation of said register to permit said meter to operate independently of the register, cooperating threaded elements associated with said connecting means, one of which elements is movable axially of one of said shafts on operation of the meter independently of the register, operating means for said flow controlling means and a control member operable on movement of said axially movable element to actuate said operating means to stop flow of liquid through said meter.

20. In combination with a liquid dispensing device having a meter, means for establishing flow of liquid through said meter and a register responsive to operation of said meter, shafts driven by said meter and register, releasable connecting means for said shafts normally serving to drive said register from said meter but releasable in response to abnormal resistance to operation of said register to permit said meter to operate independently of the register, cooperating threaded elements associated with said connecting means, one of which elements is movable axially of one of said shafts on operation of the meter independently of the register, operating means for said flow establishing means, a control member for said operating means movable to actuate the same to terminate the flow of liquid, a latch engaging said control member to hold the same against movement and means actuated by movement of said axially movable threaded element to release said latch and allow said control member to move to actuate said operating member and terminate the flow of liquid.

CHARLES S. HAZARD.